(12) United States Patent
Iverson et al.

(10) Patent No.: US 6,806,814 B1
(45) Date of Patent: Oct. 19, 2004

(54) REAL-TIME POSITIONING INTERNET PROTOCOL METHOD AND APPARATUS

(75) Inventors: Timothy James Iverson, Los Gatos, CA (US); Kai Cheung Kwong, Los Altos, CA (US); Ken J. Ju, Cupertino, CA (US); Pak Chiu Leung, Cupertino, CA (US); Son Hoanh Phuoc Le, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/479,720

(22) Filed: Jan. 7, 2000

(51) Int. Cl.[7] .............................................. G08B 21/00
(52) U.S. Cl. ............. 340/825.49; 340/989; 340/539.13; 342/357.1; 342/457; 455/404.2; 455/456.1
(58) Field of Search ...................... 340/825.49, 995.12, 340/539.15, 539.13; 310/474, 476, 465; 455/414.3, 456.1, 456.3, 456.5, 456.6, 457, 404.2; 342/357.07, 357.06, 357.09, 357.1, 457; 701/213, 215; 705/7

(56) References Cited

U.S. PATENT DOCUMENTS

| | | | | |
|---|---|---|---|---|
| 5,543,789 A | * | 8/1996 | Behr et al. ............. | 340/995.12 |
| 5,731,785 A | * | 3/1998 | Lemelson et al. ...... | 342/357.07 |
| 5,748,147 A | * | 5/1998 | Bickley et al. ............. | 342/457 |
| 5,982,281 A | * | 11/1999 | Layson, Jr. ............ | 340/539.13 |
| 6,131,067 A | * | 10/2000 | Girerd et al. ............... | 701/213 |
| 6,233,248 B1 | * | 5/2001 | Sautter et al. ............... | 370/465 |
| 6,324,473 B1 | * | 11/2001 | Eschenbach ................ | 701/215 |
| 6,327,570 B1 | * | 12/2001 | Stevens ........................ | 705/7 |
| 6,463,272 B1 | * | 10/2002 | Wallace et al. .......... | 455/404.2 |
| 6,522,875 B1 | * | 2/2003 | Dowling et al. ......... | 455/414.3 |

OTHER PUBLICATIONS

T. Imielinski and J. Navas, "GPS–Based Addressing and Routing," Network Working Group, Nov. 1996, pp. 1–27.

* cited by examiner

Primary Examiner—Edwin C Holloway, III
(74) Attorney, Agent, or Firm—Campbell, Stephenson & Ascolese LLP

(57) ABSTRACT

Internet nodes having global positioning receivers or the like are configured for communicating position information over the Internet, using an Internet protocol (IP). Preferably, information packets according to the protocol include some or all of a source identifier, a time stamp and/or an indicator of the type or format of the position information. Preferably, end-users may provide for encryption, passwords or other features for controlling the entities which can receive or use the position information.

50 Claims, 3 Drawing Sheets

REAL-TIME POSITIONING INTERNET PROTOCOL METHOD AND APPARATUS

The present invention relates to providing position or location information over the Internet and in particular to communicating the position or location information sensed at an Internet node, via an Internet protocol.

BACKGROUND INFORMATION

A number of systems have been developed or proposed for sensing global position or location. A commonly-used system is a satellite-based system known as the global positioning system (GPS). Many GPS systems use the position information locally (i.e. without communicating to a remote site). Examples include a hand-held GPS display which senses the location of the display and displays location information. Another example relates to various automobile navigation systems which include on-board computing or database information with the sensed vehicle location being used for displaying the position or location, e.g., on a map display. Other systems may communicate information based on sensed position to a remote site, but typically using non-Internet and/or proprietary communication systems or protocols. For example, some vehicle GPS systems use a cellular telephone communication or similar system to transmit location information, e.g., to an emergency response center, e.g., in case of an air bag deployment or the like.

The use of cellular telephone, proprietary and/or other non-Internet systems or protocols for communicating position information are believed to have a number of undesirable effects. Typically, such non-Internet systems are configured for only a single use or purpose. Accordingly, an owner of a car having a navigation system which sends emergency location information may need to purchase yet another system if it is desired, e.g. to use the services of a company which tracks vehicles that have been stolen. Such situation not only potentially requires a user to buy two separate hardware and software systems for two different purposes, but also presents a potential for each system transmitting substantially the same position information using two different channels or formats, thus occupying bandwidth for transmitting what is essentially redundant information.

Accordingly, it would be useful to provide a system method and apparatus for using the Internet to communicate position information, e.g., so as to make position information available for use by multiple different entities, or for multiple different functions, and/or to reduce or eliminate redundancy in communication of position information, potentially avoiding wastage of bandwidth.

In order for any type or category of information to be transmitted over the Internet, the transmission must comply with standard protocols, in particular, one or more of various Internet protocols (IP) e.g., defined by the Network Working Group, or other standards organizations. Thus, one of the barriers of current position communication systems is that typically, as noted above, different systems use different communication protocols. Accordingly, it will be useful to provide positioning information protocols of a type that can facilitate Internet communication of positioning information. On the other hand, there is already an installed base of positioning devices and procedures which may use formats and the like which are different from one another. Furthermore, even future-developed position communication systems may find it advantageous to provide for two or more different position information or formats (e.g. some systems may function most readily when information is in latitude/longitude format while others may function most readily using country/state/county-based systems, telephone area code systems and the like). Accordingly, it would be useful to provide an Internet protocol which is sufficiently uniform to make it feasible for communication over the Internet, and to make it feasible for use by multiple different parties, while still accommodating multiple different types or formats of positioning information.

At least one system has been proposed as providing for addressing and routing based on a global positioning system (see, for example, Network Working Group requests for comment (RFC) Number 2009). Such a system is primarily concerned with the sending of communications to a node based on the position or location of the node. However, using position information for routing or addressing of information does not, in itself, solve problems associated with a need for using and/or displaying positioning information at a remote site and/or for two-way communication of positioning information (as opposed to using positioning only for addressing and routing). Furthermore, systems which use positioning information for addressing and routing, use the information only when there is a communication to be addressed or routed and, accordingly, substantially do not address problems which may involve a need for periodic, frequent and/or continuous communication of a node's position to a remote location. Accordingly, it would be useful to provide a system which is configured for uses other than routing and addressing, such as systems which provide for two-way communication of positioning information and/or systems which provide periodic, frequent or continuous updates of position information.

Although numerous benefits can be provided from a system for Internet communication of positioning information, many users may also have privacy concerns such as wishing to restrict the entities who may receive and/or use position information. On the other hand, certain uses (e.g. notification of emergency services in response to an accident) may be severely compromised if positioning information is (possibly inadvertently) disabled. Moreover, it is anticipated that different users and/or purposes for positioning information may have different preferences or needs. Accordingly, it would be useful to provide a system in which the entities who can receive the position information, and/or the uses that can be made of the position information, can be defined, limited or restricted, preferably under the control of the user and preferably in such a fashion as to avoid inadvertent compromising of certain (e.g. emergency or other critical) functions. Additionally, it is anticipated that users will wish to avoid the potential for any persons other than authorized persons to redefine the authorized recipients and the like. Accordingly, it would be useful to provide a system which facilitates security of recipient definition, authorizational definitions or similar definitions or choices.

SUMMARY OF THE INVENTION

The present invention includes a recognition of the existence, nature and/or source of problems of previous approaches, including as described herein. According to one aspect, a real-time positioning protocol (RPP) is provided as an Internet protocol (IP) to facilitate, and make it feasible, to provide effective, preferably two-way, communication of global positioning or other positioning or location information over the Internet. In one embodiment, the protocol couples the position information with time information, e.g. to permit calculation of velocity, routes and the like. In one embodiment, the RPP is defined so as to accommodate two or more different positioning information formats preferably to provide compatibility with at least some existing formats used in non-Internet communication systems. In one embodiment, a system is configured such that, during at least certain times and/or under at least certain circumstances (preferably directly or indirectly controllable by the user) the system will, substantially periodically, transmit position information over the Internet. Although position information packets may be addressed to a recipient, preferably some or all packets can be configured in a "broadcast" fashion, e.g. to be available to all interested recipients.

In one embodiment, position information is encrypted in a fashion so as to be useful only to authorized recipients. In one embodiment, end users may define recipients or classes of recipients who are authorized and/or may define one or more recipients as being blocked, preferably definable as a function of time and/or location.

By providing a protocol which makes position information communication feasible for the Internet, a single system for communicating position information can be used for any of numerous different uses or functions, at relatively low cost and without unnecessarily consuming bandwidth. Although many functions or uses for the information are possible, and will be understood by those of skill in the art after understanding the present invention, illustrative examples include remote control of appliances, vehicles, robots and the like, switching of rail lines or other transportation switching or routing systems, location of military or police weaponry, personnel, or similar resources, tracking of packages, recovery of stolen vehicles or other items, locating sites of accidents, lost persons and the like, tracking wildlife (e.g. for research and the like), locating lost pets; car, ship, aircraft or other vehicle navigation; and/or for child location and/or safety purposes.

In one aspect, Internet nodes having global positioning receivers or the like are configured for communicating position information over the Internet, using an Internet protocol (IP). Preferably, information packets according to the protocol include some or all of a source identifier, a time stamp and/or an indicator of the type or format of the position information. Preferably, end-users may provide for encryption, passwords or other features for controlling the entities which can receive or use the position information.

DETAILED DESCRIPTION OF THE PREFERRED EMBODIMENT

Figure 1:
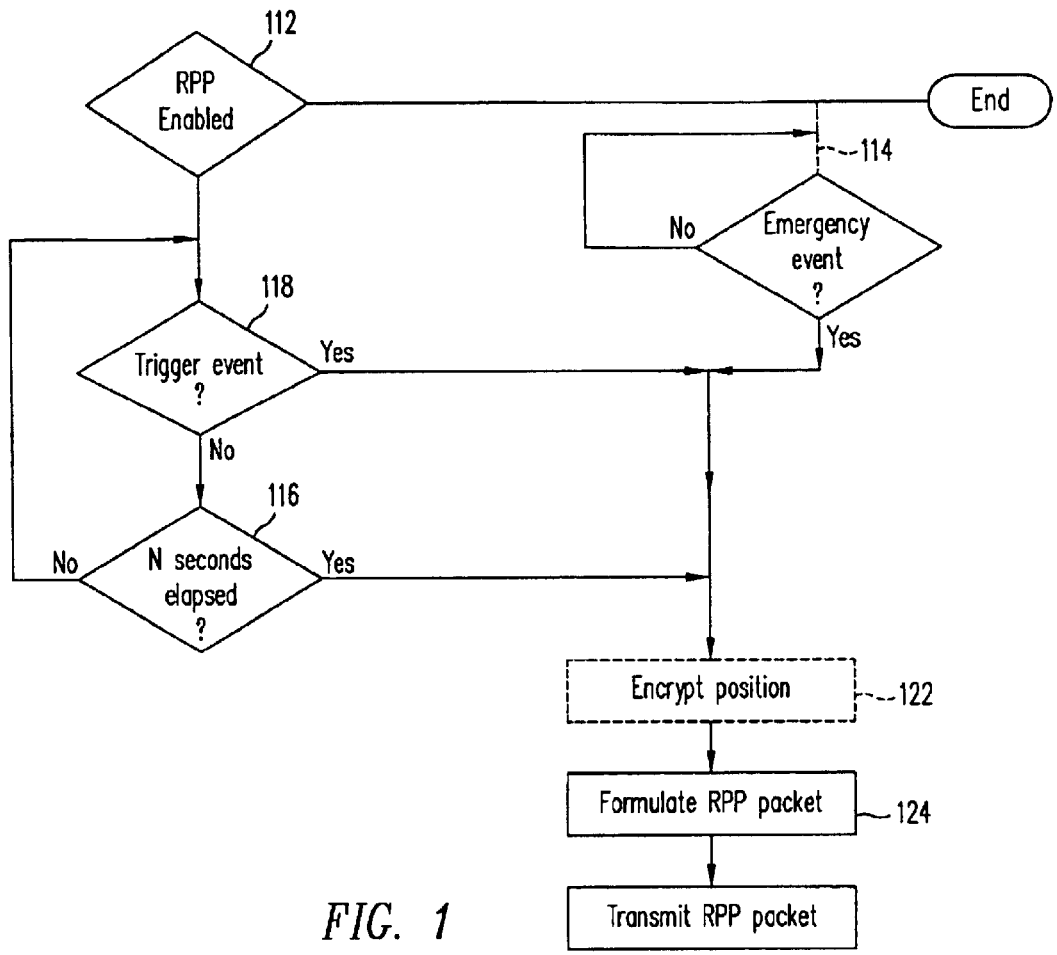
FIG. 1 is a flow chart depicting an RPP system according to one embodiment of the present invention.

As depicted in FIG. 1, preferably, users have an option to enable or disable the real-time positioning protocol (RPP) 112. For example, for a positioning system located in a car, the driver might, for example, choose to enable RPP when driving cross-country or in unfamiliar surroundings, but might disable RPP during normal commute driving. In some embodiments, it may be desirable to configure the system (preferably with the consent of the user) such that even when the user has generally disabled RPP, at least some features, such as emergency features, can still operate 114. Other procedures for controlling the system, e.g. for privacy and/or security purposes, will be described below.

In the embodiment depicted in FIG. 1, positioning information is provided both on a periodic basis, such as every N seconds 116, and in response to certain events 118 such as trigger events which indicate emergency or distress situations (e.g. air bag deployment and the like, engine malfunctions, brake malfunctions and the like).

Preferably, users can restrict or control the entities who can receive the GPS or positioning information. Although it is possible to provide a degree of control by selecting the recipients or addressees for RPP packets, it is also possible to provide for encryption of some or all of the GPS or positioning information. In one embodiment, each authorized recipient has a different encryption system or key and the system outputs several instances of the position information, each differently encrypted, depending on the intended recipient (either in a plurality of different packets, or in a single packet with a plurality of position information fields). In another embodiment, two or more authorized recipients share the same encryption system or key so that only a single instance of the position information is output, using a single type of encryption 122. In one embodiment, encryption is selected in such a way that certain authorized personnel (e.g. emergency response units) can obtain necessary position information regardless of the presence of encryption. In some embodiments, it is desired to provide different types or levels of position information to different recipients (e.g. some recipients may receive only coarse position information, such as city information, while others may receive more detailed information, such as location within, e.g. a city block, location within a building or the like). In one embodiment, different levels of information are differently encrypted so that certain recipients can only decrypt relatively coarse position information while others have the ability to decrypt so as to receive detailed location information.

Figure 2:
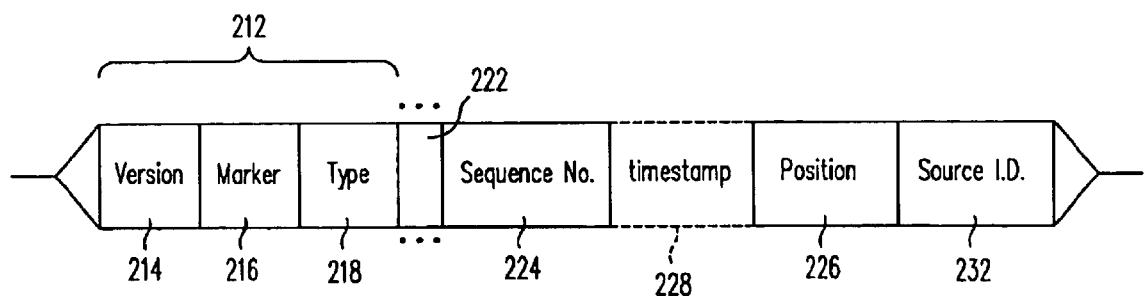
FIG. 2 is a schematic block diagram of a positioning information packet according to one possible real-time positioning protocol scheme, useable as an Internet protocol.

Following encryption (if any), the system will formulate an RPP packet 124. FIG. 2 provides one illustrative example of a type of packet that might be used in connection with RPP. However, as those of skill in the art will understand, after understanding the present disclosure, real-time positioning protocols can be standardized in any of a number of fashions, and the packet format or protocol of FIG. 2 should be understood only as illustrating one positioning protocol that could be used. Those of skill in the art will understand how to select encoding schemes, field lengths and the like. In the embodiment of FIG. 2, the packet can contain a number of different types of header information 212. In the embodiment of FIG. 2, the header information can include a version indicator 214 (e.g. indicating which version of RPP is being used, and/or indicating that this packet is an RPP packet), a marker field 216 (e.g. for facilitating marking of frame boundaries indicating the number of bits in other fields and the like) and a type field 218, indicating the format of the position information or other information in the packet. As will be understood by those of skill in the art, other fields 222 can be included such as padding fields, extension fields and the like. In the embodiment of FIG. 2, a sequence number field 224 provides a packet sequence indicator, e.g. to facilitate proper sequencing of RPP packets which may arrive in an order different from the transmission order. Although it is possible to provide RPP packets which contain substantially only position information 226 (typically in addition to header information), in the embodiment of FIG. 2, the RPP packet also contains time stamp information 228. Providing time stamp information allows a recipient to know where the user (or node) was at particular times, e.g. for purposes of calculating velocity, path and the like. Preferably, the packet contains a source identifier 232 so that the recipient not only can calculate a position but will be able to determine the identity of the entity or node which is at that position.

Figure 3:
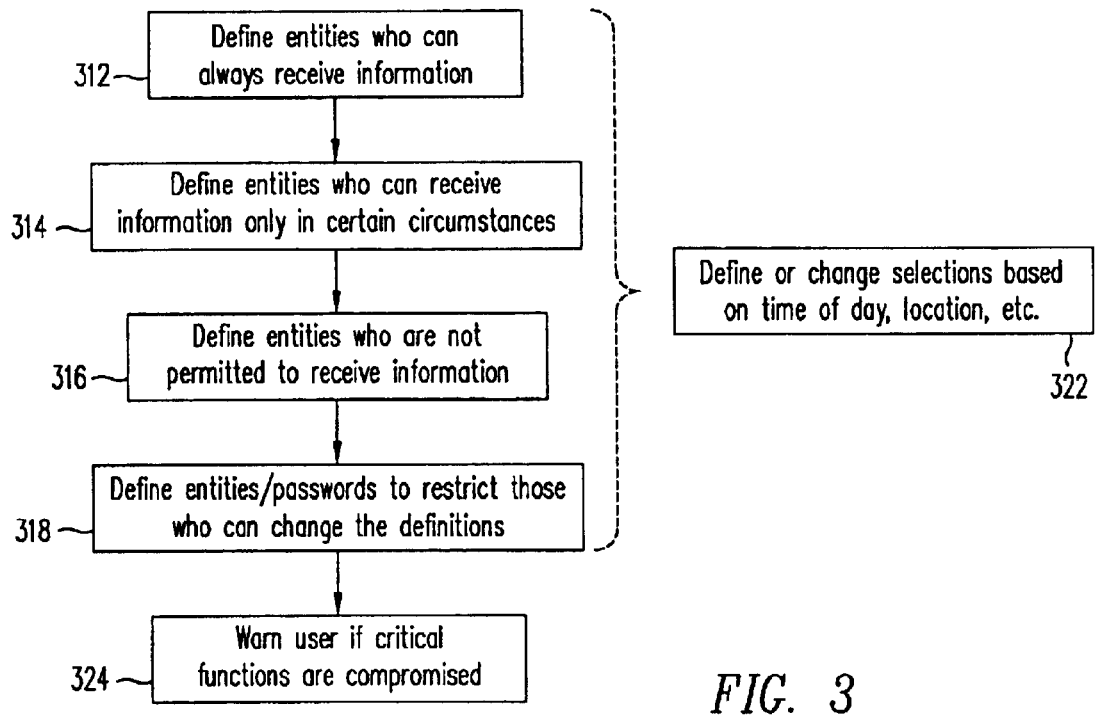
FIG. 3 is a flow chart depicting a process for defining privacy and/or security parameters according to an embodiment of the present invention.

As noted above, several systems are useable for controlling which entities are authorized to receive the position information, including defining destination addresses, using encryption, using passwords and the like. Regardless of the system used, the present invention preferably accommodates initiating and/or modifying such privacy-protecting features. In the embodiment depicted in FIG. 3, a user is permitted to define one or more entities who are always permitted to receive position information 312. For example, the user may wish to configure the system such that a spouse can always access position information. This may be done, e.g., by storing the spouse's universal resource locator (URL) in a table of authorized recipients. Alternatively, this may be implemented by storing an encryption code (for which the spouse has the key) in a table. In the embodiment depicted in FIG. 3, the user can also define entities who can only receive position information in certain circumstances 314. For example, preferably the system will store, in a table, the URLs, encryption codes and the like for emergency response units, police, fire or other entities who are authorized to receive position information, e.g. in response to a trigger event such as deployment of an air bag and the like. In one embodiment, a user may define (e.g. in a table, in the node) one or more entities who are to be blocked from receiving position information 316.

In order to provide for security of the system, this system preferably also stores or defines entities who are authorized to change the privacy-protecting data 318 and/or provides passwords to control access to the privacy-protecting data. In one embodiment, the definition of the various entities can be changed as a function of factors such as the time of day, location or the like 322. For example, in one embodiment, a unit carried by a child may be configured to provide position information to a school, during school hours, and to provide position information to a parent during other times.

Preferably, if a user attempts to alter definitions in a manner which could compromise certain critical functions such as safety functions, emergency functions and the like (such as attempting to prevent transmission of position information to police, fire or other emergency personnel). The user is provided with a warning of this effect and asked to verify that this is the user's intent 324.

Figure 6:
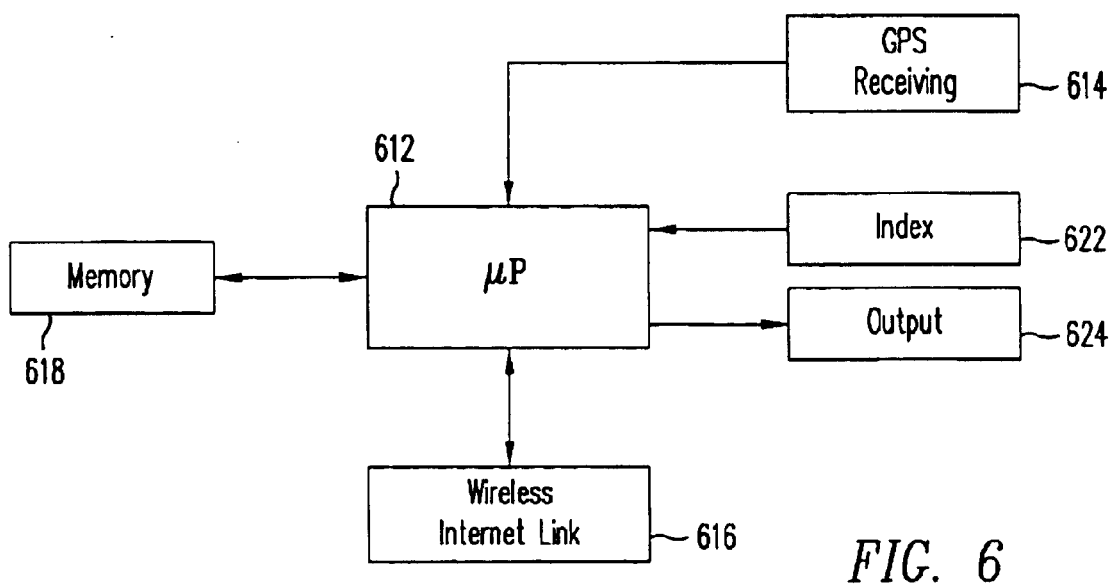
FIG. 6 is a block diagram of a mobile Internet node figured for communicating position information according to an embodiment of the present invention.

A number of Internet node systems can be provided for implementing embodiments of the present invention. In the illustration of FIG. 6, the system is provided with a microprocessor 612 receiving input from a global positioning system receiver 614. The system can communicate over the Internet via a wireless Internet link 616 such as a radio link, infrared link and the like. The position information 226 can be provided in any a number of different formats (preferably some or all of which are then encrypted, as described above). For example, position information can be provided in the form of raw GPS data, can be provided in the form of longitude and latitude information, can be provided with respect to political or geographic boundaries or landmarks (e.g. defining the country, state, county, and city positions and the like) or other formats, as will be understood of those of skill in the art after understanding the present disclosure.

A memory 618 stores information such as entity definition tables (FIG. 3) configuration information such as trigger event information 118, enablement 112, frequency of communication 116, position formats and the like. Preferably the system includes an input device (such as a keyboard, mouse or other pointer device, touch screen, voice recognition system and the like) 622 for receiving configuration or definition information and an output device 624, e.g. for displaying position information or related information.

By providing an Internet communication capability, and by providing a protocol to establish a common communication basis for a number of different entities or uses, several functions of positioning information provided over the Internet are facilitated. Those of skill in the art will understand numerous different uses or implementations, after understanding the present disclosure. However, a number of illustrative examples of uses or implementations will be provided.

Figure 4:
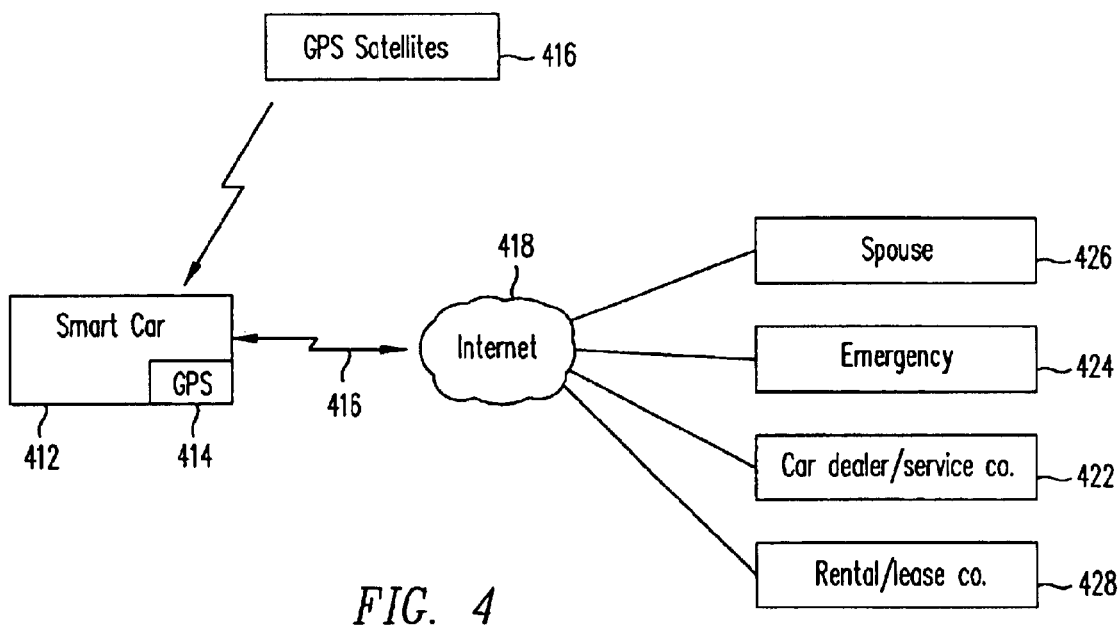
FIG. 4 is a block diagram depicting one example of a use involving positioning with respect to a smart car.

As depicted in FIG. 4, in one example, a automobile is provided with sensors which can detect numerous engine status information, malfunctions and the like (i.e. a so-called "smart car") 412. In the embodiment of FIG. 4, the smart car 412 includes a GPS receiver 414 for receiving GPS information from a plurality GPS satellites 416, from which position information can be determined. In one embodiment, if an engine malfunction is detected by the smart car 412, the current position of the vehicle is output 416 using the RPP of the present invention, over the Internet 418, e.g. to a closest car dealer, service company and the like 422 which can take appropriate action such as providing instructions to the driver, dispatching mechanics, and the like. Numerous other uses of positioning information can be provided in connection with the smart car 412 of FIG. 4, including providing for transmission of position information to emergency services 424, e.g. upon request by the driver, or upon sensing of certain emergency-indicators, providing position information on a periodic or continuous basis to a spouse 426, providing tracking information to an automobile leasing or renting company 428, e.g. to assure compliance with leasing or renting terms, or the like.

Figure 5:
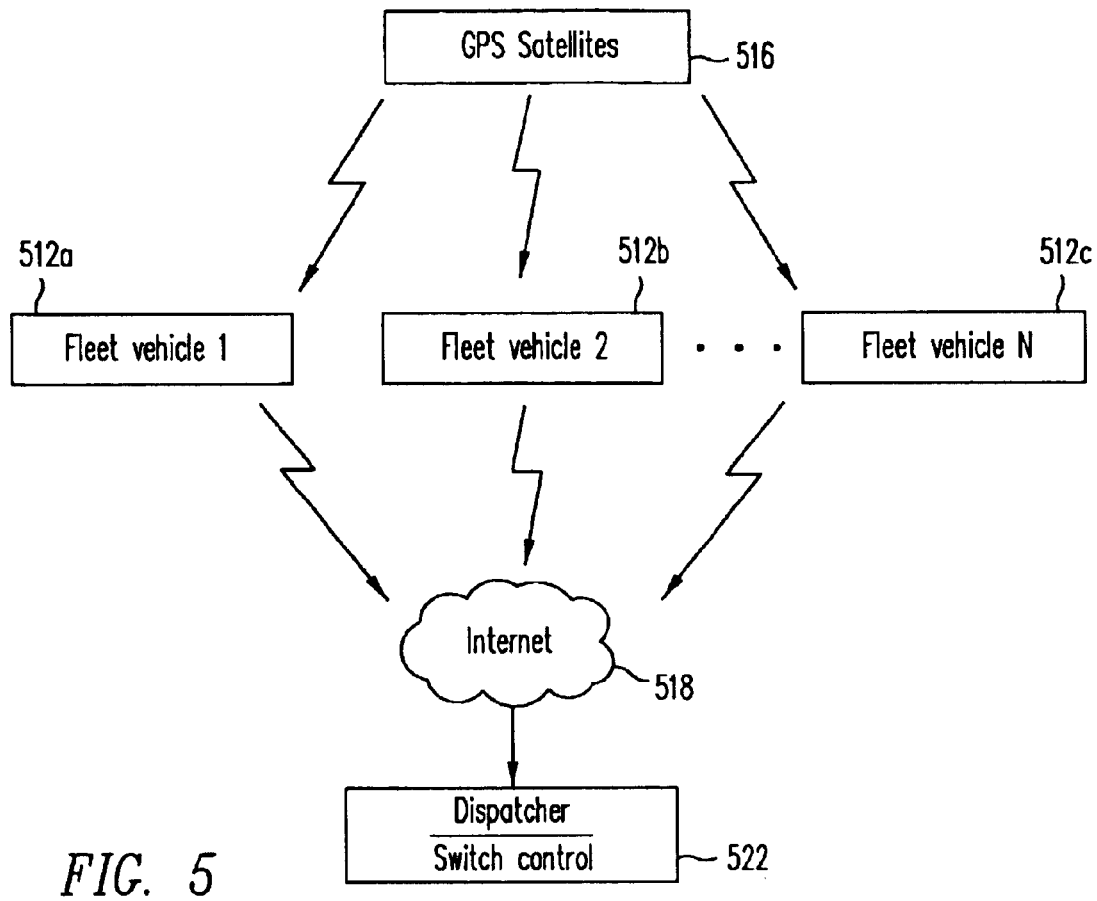
FIG. 5 is a block diagram depicting one illustration of a use involving a vehicle fleet according to an embodiment of the present invention.

In the embodiment of FIG. 5, each of a plurality of fleet vehicles 512*abc* receives positioning information from GPS satellites 516 and provides position information via the Internet 518 to a dispatcher or switch control entity 522. As one example, railroad track switching typically requires accurate position reporting, since the amount of track available to be used is directly proportional to the accuracy of the position reports of the current trains. Network protocols for tracking train movement can enable switching personnel to optimize track utilization.

As another example, control over robotic devices can benefit from accurate position and movement vectors. Accuracy in position and movement can avoid damage to a robot or its surroundings. For deep sea or other hostile environment exploration, it may be commonly necessary to provide remote operators (since the most skilled operators may not be readily available on the scene, especially in time-critical operations such as perishable goods recovery or rescue).

In another example, positioning information provided over the Internet can be used for reporting and/or controlling military or other weaponry such as missiles (including cruise missiles) target drones and the like. This is especially useful in the context of missiles which may require accurate position and vector information, but may have limited on-board resources with which to correlate the information with respect to the target. Communication of such data using Internet protocols (IP) potentially provides a missile with greater potential resources for supplying control information, e.g. for more complex behavior than is available with current missiles. The real-time nature, robustness and the general availability of IP networks makes deployment of this application feasible in a wider geographic scope.

In another example, packages in transit can have their position reported to a central remote location, e.g. by scanning packages as they traverse various check points (possibly in a partially or fully automated fashion) and/or may have devices included in or attached to the packages for reporting current position over the Internet. Although, at the present time, costs of such a system would likely limit attachment of Internet nodes only to relatively valuable packages or cargo, as less expensive Internet node hardware and/or GPS hardware becomes available, such Internet-communicating components may be routinely coupled to packages upon shipment.

As another example, devices which can report position over the Internet can be coupled to, or embedded in, objects for purposes of deterring theft or recovering stolen properties. Reporting the position of items can be useful not only with items which are normally mobile (automobiles and the like) but any items which might be commonly the subject of theft (cameras, sound systems and the like).

As another example, reporting of positioning can be useful in connection with locating resources, such as in an emergency or other situation. For example, in response to the occurrence of an emergency, the present invention could be used for quickly locating the closest crane or other heavy equipment that might be needed for an emergency response.

As another example, aircraft flight data recorders, voice recorders or other accident analysis devices can use RPP for broadcasting locations on a periodic or continuous basis, so that a location prior to an emergency situation is more clearly known, to aid both rescue and recovery operations.

As another example, locators for wildlife or other animals which use the Internet for communicating animal location (e.g. for wildlife research, recovery of lost pets, controllor inventory of livestock and the like) can provide for reduction in cost of such systems by using the Internet for communicating position.

As another example, a number of current automobile or other vehicle navigation systems provide substantially all of the navigation data and/or software on-board (i.e. on the vehicle itself) which can limit the amount of data or computing power available for navigation or other purposes. By providing for communication of position information to a central location, it becomes more feasible to bring greater computational or data resources to bear, since relatively greater resources can be concentrated at a remote location. Location or navigation information can be used for navigation by private citizens, position coordination of emergency vehicles and the like. Leveraging the IP network for communicating such data potentially allows for a wider user base as compared to, e.g., proprietary or less wide-spread systems.

As another example, devices which report position over the Internet can be carried by children (or attached to a child's clothing or the like) to report the position of children to a base unit. In one embodiment, the base or remote unit can determine children's departure from normal or approved tasks (e.g. detours from a path to school), locations in dangerous areas, and the like. Periodic or continuous reporting of children's positions can be provided for purposes of reassuring parents, e.g. who may be at work, and the like.

In light of the above description, a number of advantages of the present invention can be seen. The present invention facilitates and/or makes it feasible to use the Internet for communicating position information preferably in a standard and/or protocol fashion and preferably in a fashion that can potentially be used by numerous different receiving entities. The present invention makes it feasible for users to control or regulate the entities which will receive position information. The present invention provides for accommodating communication of position information in numerous different formats even though employing a common communication protocol. The present invention can reduce the costs involved in monitoring or obtaining location information, e.g. by using the already-established Internet.

A number of variations and modifications of the invention can be used. It is possible to use some aspects of the invention without using others. For example, it is possible to provide an Internet protocol to facilitate communication of position information over the Internet without providing for end-user control of encryption. Although a RPP packet has been illustrated, those of skill in the art will understand that RPP packets can be provided with more or fewer fields, can provide fields in an order different from that depicted, can provided for one or more layers of encapsulating the packet in other fields and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for real-time positioning comprising:
   a global positioning receiver which outputs first information indicative of position; and an Internet node coupled to said global positioning receiver, which outputs, to the Internet, a plurality of information packets according to an Internet protocol (IP), wherein an overhead portion of at least some packets includes a position information field, the position information field including position-indicative information, based on the said first information, wherein the position-indicative information indicates a position of the Internet node;

wherein said Internet node is configured to control which entities receive said at least some packets; and wherein said Internet node is configured to control which of said entities receiving said at least some packets can access said position-indicative information comprised in said at least some packets.

2. Apparatus, as claimed in claim 1, wherein said at least some packets also include a source identifier.

3. Apparatus, as claimed in claim 1, wherein said at least some packets also include time information.

4. Apparatus, as claimed in claim 1, wherein said Internet node is configured to control which entities receiving said at least some packets can access said position-indicative information by encrypting.

5. Apparatus, as claimed in claim 1, wherein said overhead portion of in said at least some packets includes a type field indicative of a format of said position-indicative information.

6. Apparatus, as claimed in claim 1, wherein said Internet node outputs packets to the Internet by a wireless link.

7. Apparatus, as claimed in claim 1, wherein said at least some packets include information indicating that said packets include position-indicative information.

8. A method for real-time positioning comprising:

receiving, at a first global positioning receiver, coupled to an Internet node, global positioning signals;

outputting, from said global positioning receiver to said Internet node, first information indicative of a position;

outputting, from said Internet node to the Internet, a plurality of information packets according to an Internet protocol (IP), wherein an overhead portion of at least some packets includes a position information field, the position information field including position-indicative information, based on the said first information, wherein the position-indicative information indicates a position of the Internet node; and controlling which entities receive said at least some packets; and controlling which of said entities receiving said at least some packets can access said position-indicative information comprised in said at least some packets.

9. A method, as claimed in claim 8, wherein said step of outputting comprises outputting packets which include a source identifier.

10. A method, as claimed in claim 8, wherein said step of outputting comprises outputting packets which include time information.

11. A method, as claimed in claim 8, wherein said controlling comprises encrypting said position-indicative information.

12. A method, as claimed in claim 8, wherein said step of outputting comprises outputting packets which include a type field indicative of a format of said position-indicative information.

13. A method, as claimed in claim 8, wherein said step of outputting comprises outputting packets to the Internet by a wireless link.

14. A method, as claimed in claim 8, wherein said step of outputting comprises outputting at least some packets which include information indicating that said packets include position-indicative information.

15. Apparatus for real-time positioning comprising:

an Internet node;

means in said Internet node for formatting a plurality of information packets according to an Internet protocol (IP), wherein an overhead portion of at least some packets includes a position information field, the position information field including position-indicative information, based on first information indicative of a position, wherein the position-indicative information indicates a position of the Internet node;

means for outputting, from said Internet node to the Internet, the said plurality of packets; and means for controlling which entities receive said at least some packets; and means for controlling which of said entities receiving said at least some packets can access said position-indicative information comprised in said at least some packets.

16. Apparatus, as claimed in claim 15, wherein said means for outputting comprises means for outputting packets which include a source identifier.

17. Apparatus, as claimed in claim 15, wherein said means for outputting comprises means for outputting packets which include time information.

18. Apparatus, as claimed in claim 15, wherein said means for controlling control which entities receiving said at least some packets can access said position-indicative information by encrypting said position-indicative information.

19. Apparatus, as claimed in claim 15, wherein said means for outputting comprises means for outputting packets which include a type field indicative of a format of said position-indicative information.

20. Apparatus, as claimed in claim 15, wherein said means for outputting comprises means for outputting packets to the Internet by a wireless link.

21. Apparatus, as claimed in claim 15, wherein said means for outputting comprises means for outputting at least some packets which include information indicating that said packets include position-indicative information.

22. Apparatus, as claimed in claim 15, further comprising a global positioning receiver, coupled to said Internet node, for providing said first information to said Internet node.

23. A method, as claimed in claim 11, wherein said encrypting is performed before said position-indicative information is included in said at least some packets.

24. Apparatus, as claimed in claim 1, wherein said Internet node is configured to disable the outputting of one or more information packets in response to user input, wherein said one or more information packets include said position information field.

25. Apparatus, as claimed in claim 24, wherein said Internet node does not disable the outputting of an emergency information packet in response to said user input, wherein said emergency information packet includes the position information field and is generated according to an emergency feature.

26. Apparatus, as claimed in claim 1, wherein said Internet node is configured to encrypt each of a plurality of instances of said position-indicative information differently; and said Internet node is configured to output said instances of said position-indicative information to the Internet.

27. Apparatus, as claimed in claim 26, wherein
said Internet node is configured to include each of said instances of said position-indicative information in a single information packet; and
said single packet includes a position information field for each of said instances of said position-indicative information.

28. Apparatus, as claimed in claim 27, wherein
each of said instances of said position-indicative information specifies a different level of position-indicative information.

29. Apparatus, as claimed in claim 1, wherein said Internet node is configured to allow a user to define a first class of entities who can always receive information packets containing position-indicative information.

30. Apparatus, as claimed in claim 29, wherein said Internet node is configured to allow the user to define a second class of entities who can only receive information packets containing position-indicative information in certain circumstances.

31. Apparatus, as claimed in claim 30, wherein said Internet node is configured to allow the user to define a third class of entities blocked from receiving information packets containing position-indicative information.

32. Apparatus, as claimed in claim 1, wherein said at least some packets include information indicating an engine malfunction.

33. A method, as claimed in claim 8, further comprising disabling the outputting of one or more information packets, in response to user input,
wherein said one or more information packets include said position information field.

34. A method, as claimed in claim 33, wherein the outputting of an emergency information packet is not disabled in response to said user input,
wherein the emergency information packet includes the position information field and is generated according to an emergency feature.

35. A method, as claimed in claim 8, further comprising:
encrypting each of a plurality of instances of said position-indicative information differently; and
outputting each of the instances of said position-indicative information to the Internet.

36. A method, as claimed in claim 35, wherein each of said instances of said position-indicative information is included in a single information packet; and
the single packet includes a position information field for each of said instances of said position-indicative information.

37. A method, as claimed in claim 36, wherein
each of said instances of said position-indicative information specifies a different level of position-indicative information.

38. A method, as claimed in claim 8, further comprising:
allowing a user to define a first class of entities who can always receive information packets containing position-indicative information.

39. A method, as claimed in claim 38, further comprising:
allowing the user to define a second class of entities who can only receive information packets containing position-indicative information in certain circumstances.

40. A method, as claimed in claim 39, further comprising:
allowing the user to define a third class of entities blocked from receiving information packets containing position-indicative information.

41. A method, as claimed in claim 8, wherein said at least some packets include information indicating an engine malfunction.

42. Apparatus, as claimed in claim 15, further comprising:
means for disabling said outputting of one or more information packets, in response to user input,
wherein said one or more information packets include said position information field.

43. Apparatus, as claimed in claim 42, further comprising:
means for outputting of an emergency information packet,
wherein said emergency information packet includes the position information field, and
wherein said means for outputting of an emergency information packet are not disabled in response to said user input.

44. Apparatus, as claimed in claim 15, further comprising:
means for encrypting each of a plurality of instances of said position-indicative information differently; and
means for outputting each of the instances of said position-indicative information to the Internet.

45. Apparatus, as claimed in claim 44, wherein each of said instances of said position-indicative information is included in a single information packet; and
the single packet includes a position information field for each of said instances of said position-indicative information.

46. Apparatus, as claimed in claim 45, wherein
each of said instances of said position-indicative information specifies a different level of position-indicative information.

47. Apparatus, as claimed in claim 15, further comprising:
means for allowing a user to define a first class of entities who can always receive information packets containing position-indicative information.

48. Apparatus, as claimed in claim 47, further comprising:
means for allowing the user to define a second class of entities who can only receive information packets containing position-indicative information in certain circumstances.

49. Apparatus, as claimed in claim 48, further comprising:
means for allowing the user to define a third class of entities blocked from receiving information packets containing position-indicative information.

50. Apparatus, as claimed in claim 15, wherein said at least some packets include information indicating an engine malfunction.

* * * * *

UNITED STATES PATENT AND TRADEMARK OFFICE
CERTIFICATE OF CORRECTION

PATENT NO.   : 6,806,814 B1
DATED        : October 19, 2004
INVENTOR(S)  : Timothy James Iverson et al.

It is certified that error appears in the above-identified patent and that said Letters Patent is hereby corrected as shown below:

<u>Column 9,</u>
Line 24, the phrase "head portion of in said" should read -- head portion of said --

Signed and Sealed this

Twenty-sixth Day of July, 2005

JON W. DUDAS
*Director of the United States Patent and Trademark Office*